April 11, 1939.  G. H. SCHIEFERSTEIN  2,154,361
SYSTEM FOR THE TRANSMISSION OF MECHANICAL POWER
Filed April 15, 1936  3 Sheets-Sheet 1
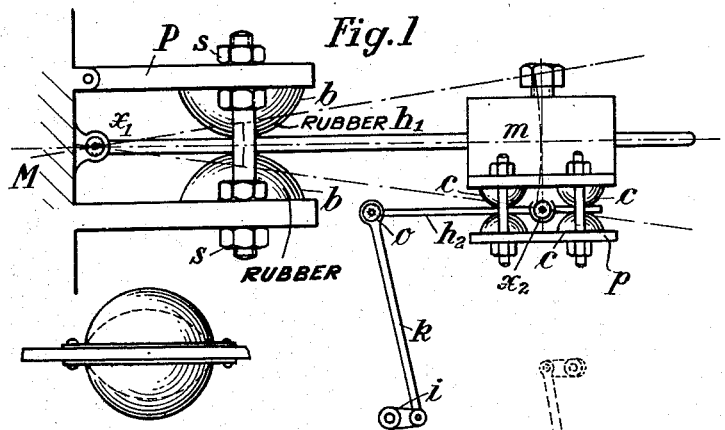
Fig.1
Fig.2
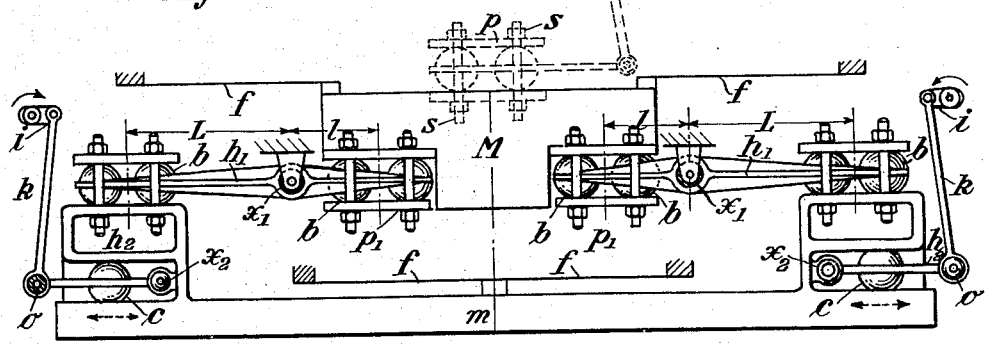
Fig.3
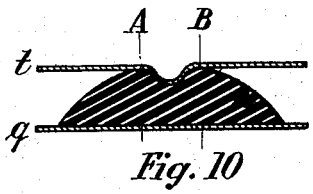
Fig.10
Fig.11
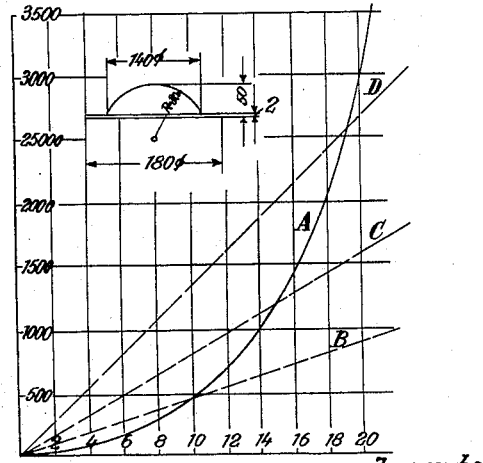
Fig.4
Inventor:
Georg Heinrich Schieferstein
By Frank S. Appleman, Atty.

Inventor:
Georg Heinrich Schieferstein

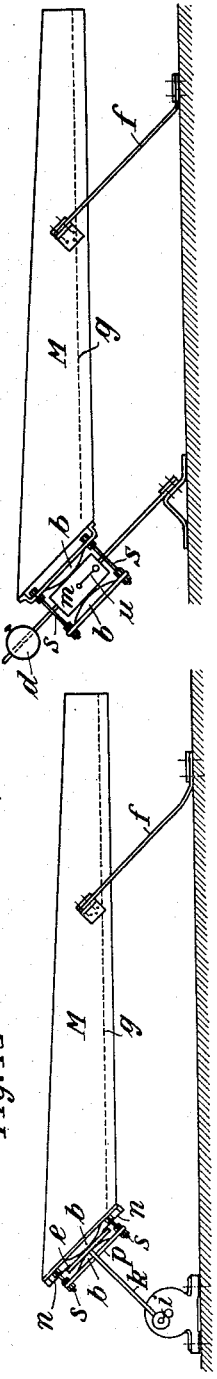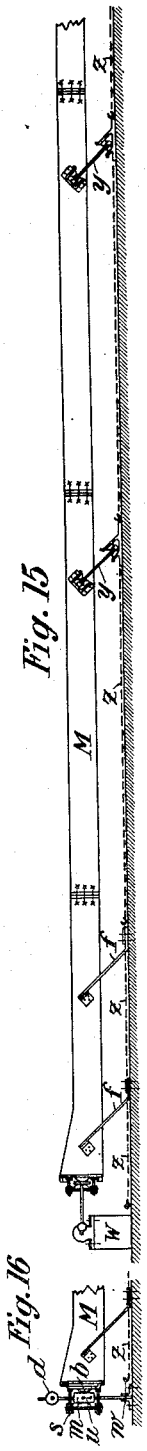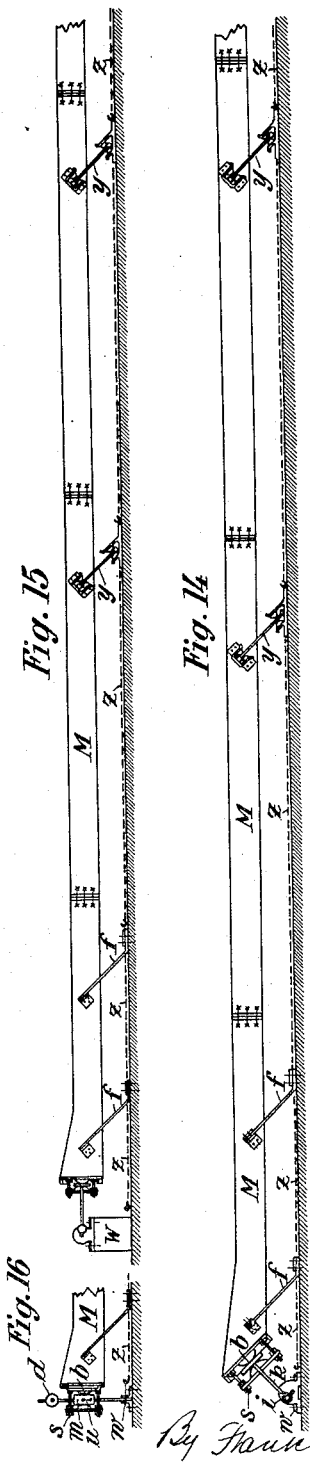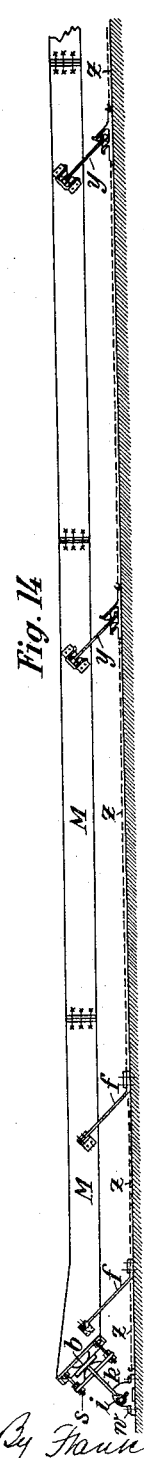

Patented Apr. 11, 1939

2,154,361

UNITED STATES PATENT OFFICE 2,154,361

SYSTEM FOR THE TRANSMISSION OF MECHANICAL POWER

Georg Heinrich Schieferstein, Berlin-Charlottenburg, Germany

Application April 15, 1936, Serial No. 74,571
In Germany April 24, 1935

9 Claims. (Cl. 74—26)

This invention relates to mechanical systems for the transmission of power in oscillating form, of the kind in which a driving mechanism is connected to an elastically constrained driven mechanism adapted to oscillate with a pronounced natural frequency and variable amplitude through an interposed "loose-coupling" adapted to transmit energy to said driven system without substantially interfering with the natural frequency thereof, and in which the periodicity of the driving mechanism and the natural frequency of the driven mechanism are in tune. Mechanical systems of this type have been described in the specifications of my British Patents Nos. 188,633 and 237,934, which at the same time describe various types of "loose couplings".

In operating such mechanisms, it has transpired that in the event of fluctuations in the source of energy, whether in respect of power or of frequency, such mechanisms are liable to get out of resonance, their efficiency being thereby reduced, or their operation adversely affected. In order to prevent this, it has already been proposed to design the elastic member of the loose coupling in such a way as to produce pseudo-harmonic or inharmonic oscillations. This means has been found favourable, for example in the case of resonance screens, in which, although the conditions for optimum working can be determined in accordance with the laws governing the shovel action, the conditions established by the cohesion or adhesion of the material to be screened, produce a deviation, from the laws of oscillation, which has to be corrected. This correction can be effected by suitably influencing, or dimensioning, the elastic means producing the pseudo-harmonic oscillations. Known types of elastic means comprise metal springs, air- and gas cushions, and rubber, the first two of which—either singly or in combination—have also been employed for producing pseudo-harmonic oscillations.

The present invention is concerned with the arrangement and design of elastic means, composed of rubber, for loose-coupled mechanisms oscillating with variable amplitude, so that the transmitted oscillatory movement will be pseudo-harmonic. The invention consists substantially in the employment, as the elastic means between the energising and energised rigid portions of the oscillating device, of solid rubber members, which are stressed in the axial direction, their cross-section which transmits the oscillating energy being constant on the one surface of contact and variable, in accordance with the existing or resulting pressure, on the other surface of contact.

The design of the solid rubber members in accordance with the invention, and/or that of the rigid portions of the mechanism transmitting the oscillations to said rubber members, enables very large oscillation forces to be transmitted pseudo-harmonically, whilst the amplitude of the elastic means is comparatively small, and therefore the space required for the elastic means and its spatial displacement is also merely small. These properties, however, also enable oscillations of very large amplitude to be transmitted when, in accordance with the invention, transmission levers are provided between the oscillating portion of the mechanism and the elastic means.

In order more clearly to understand the invention reference is made to the accompanying drawings which illustrate diagrammatically and by way of example, various embodiments thereof and in which:

Fig. 1 represents a loose-coupled system, adapted to oscillate with variable amplitude, and provided with elastic means and a one-armed transmission lever;

Fig. 2 shows an inverted arrangement of the elastic means according to Fig. 1;

Fig. 3 shows an oscillatory system, balanced in respect of force and inertia effects and provided with the elastic means in accordance with the invention;

Fig. 4 represents the tension curve of the elastic means;

Figs. 10 and 11 show modified forms of elastic means;

Fig. 12 shows the application of the elastic means to a unilaterally driven screen using a potential coupling;

Fig. 13 shows the same application, using a kinetic coupling;

Fig. 14 shows an arrangement according to Fig. 12 designed as a conveyor trough;

Fig. 15 shows the drive of the trough in the longitudinal direction; and

Fig. 16 is a modification of the drive shown in Fig. 13.

Figure 5:
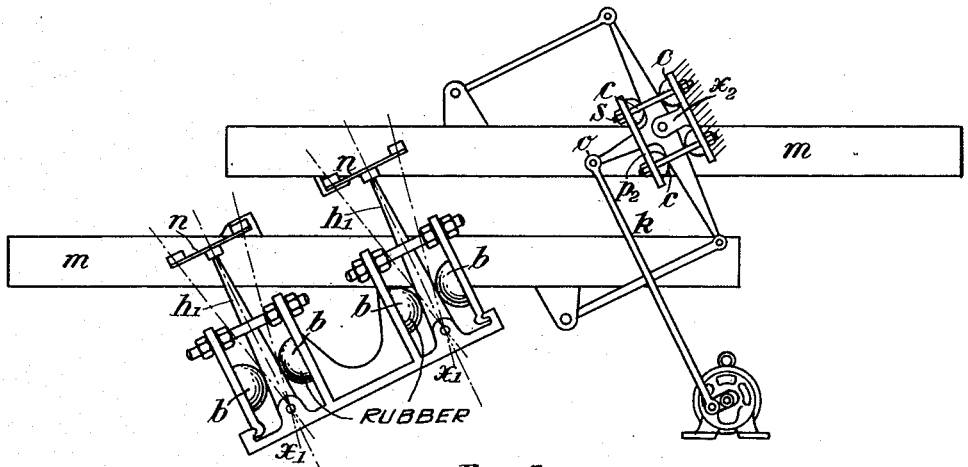
Fig. 5 is a typical embodiment of a loose coupling for large amplitudes.

In the embodiment shown in Fig. 1, the mass $m$ is of finite (measurable) dimensions, and the mass M (the earth) is to be regarded as infinitely great. Elastic rubber members, of approximately hemispherical form, are interposed between the two masses. On compression being applied to the rubber member of this form and having about the dimensions (0–20 mm.) chosen in Fig. 4, the stress curve A will be obtained. This curve is decidedly elliptical, that is to say, the effort of the compression meets, at first, with a very slight resistance, which progressively increases, whereas, in the case of simple steel springs, for example, the elasticity constant of which is invariable, the stress curve takes a linear ascension, characterized approximately by the broken lines B, C, D.

The stress curve A forms, in all cases, the basis for a pseudo-harmonic course of the oscillations. The characteristic course of the stress curve, as shown in Fig. 4, will be at the optimum value when the axial height of the rubber member is small in comparison with the diameter of the constant surface of contact, or when said height is small in comparison with the radius of curvature of the variable contact surface. In the case of the rubber member shown in Fig. 4, the axial height is, for example, 50 mm. whilst the diameter of the constant surface is selected as 140 mm. and the radius of curvature of the variable contact surface as 80 mm. As can be seen from Fig. 4, the resistance offered by such a rubber member on compression merely to the extent of 20 mm., increases very rapidly from 0 to about 3500 kg. thereby demonstrating the particular suitability of this elastic means for large forces, when lever transmission is employed. If therefore, for example, a comparatively high transmission ratio of about 1:3, be chosen, maximum resistant forces of over 1000 kg. will still always act on the mass $m$, in the case of a comparatively large amplitude of oscillation, amounting to 60 mm. that is, a stroke of 120 mm. Hitherto, oscillatory devices in which such large amplitudes and forces are attained, could be constructed only by employing large and very heavy steel springs, whereas the provision of rubber members for that purpose was impossible. In the case of the existing rubber members employed as elastic means, a further particularly unfavourable effect resulted from the fact that rubber can only be subjected to unilateral loading, and consequently had to be subjected to initial pressure extending throughout the entire amplitude. It is true that, in certain circumstances, this also applies to the rubber members, with variable surface of contact, employed in the present invention; but it may also be left out of consideration, according to the work to be performed by the resonance machine concerned, since, even in the event of an air gap when in central position, a gentle, inaudible transition is attainable.

A point of special importance, however, in starting (energising) such oscillatory systems is the constructional design of the "loose coupling", since, in this case, it must be borne in mind that the coupling- or lost energy must be transmittable, even in the case of maximum throw and with a phase displacement of 180° in relation to the oscillating mass. In such case, a possible measure, according to Fig. 1, is that although, by employing the same means (hemispherical rubber members $c$ and lever transmission), an increase coupling stroke can be obtained, this is not required for normal running because the stroke transmitted by the oscillating mass through the lever $h_1$, from left to right, is increased, whilst that transmitted by the coupling through the lever $h_2$, from right to left, is also increased. Through the combined action of the two transmissions, the point of application $o$ of the drive $k$, $d$, of the coupling, is therefore brought nearer to the pivotal axis $x_1$ of the oscillating system, and its stroke is thereby again reduced.

In accordance with the problem to be solved, a possibility must also be afforded of correcting the preliminary calculation, as initially established. As regards the oscillating system, the correction consists, on the one hand, in lowering the frequency, towards the right, and increasing it towards the left, by sliding the mass $m$ on the arm of the lever. In cases where the frequency cannot be modified in this manner, it can be effected, within relatively wide limits, by moving the rubber members $b$, closer together, or farther apart, by means of the screw-bolts $s$, thereby modifying their preliminary stress, or resistance.

The oscillating pivotal points $o$, $x_1$ and $x_2$ may be advantageously provided with elastic bearings. Designing the rubber members $b$ and $c$ in the manner represented in Fig. 2 also falls within the scope of the invention.

A typical embodiment of an oscillatory system, balanced in respect of force and inertia effects, is shown in Fig. 3, as employed in practice on consolidating machines for road making. In this case, the mass $m$ represents the ram for ramming and cambering the road surface. The machine M forms a counterpoise which increases the inherent wattless energy of the machine, after the manner of a flywheel and balances the force and inertia effects for the purpose of ensuring the smooth running of the machine.

The mass $m$ is energised by synchronised couplings, $i$, $k$, coming into action on both sides, their ratio of transmission being modifiable by horizontally shifting the rubber members $c$, which have a pseudo-harmonic action. The pivotal points $o$ and $x_2$ may have positive or rubber bearings. The elastic means $b$ connect the masses $m$ and M, elastically, through the transmission levers $h_1$. The pivotal points $x_1$ of the said levers $h_1$ are mounted on the frame in any convenient manner. The imaginary pivotal points located between each two rubber members $b$ do not require any bearings, since the masses $m$ and M are constrained on all sides, by springs $f$.

If the leverage of the transmission levers of the oscillatory system be selected so that $l.M=L.m$, the oscillating system will be in equilibrium, like the beam of a balance, and will then comply with all the conditions of a system balanced with respect to force and inertia effects. The frequency of the oscillation can then be obtained by increasing or reducing the preliminary stress of the rubber members $b$; and the coupling by horizontally displacing the rubber members $c$, or also by altering the cranks $i$.

If, for any reason, it should be desired that the coupling acts on the mass M, this can be done in the manner represented by broken lines. In such case, the transmission of effort can be modified by altering the initial stress of the rubber members $c$ of the coupling. By a preliminary calculation, or estimation, of the resistance forces of the rubber members, they may be selected, in all cases, in such a manner that only very slight corrections will be needed, in adjusting the machine, for obtaining a real optimum in all cases.

The embodiment shown in Fig. 5, represents a shaker trough with a particularly long stroke. Here again, b denotes the elastic means of the oscillatory system, and $h_1$ the transmission levers pivoting on the points $x_1$. If the damping resulting from the use of links is to be prevented, the said levers can be articulated to the trough bodies by flexible members n which may consist of leather belts, steel bands, or the like. The attainable throw, that is, the amplitude and stroke, of the trough bodies can, in this case, be of very large dimensions, so as to obtain correspondingly high outputs and efficiencies of the conveyor. A typical embodiment of a coupling for such large throws is shown in Fig. 5, where the rubber members are again indicated by c, the pivotal point of the coupling by $x_2$ and that of the point of application by o. By tightening up the screw-bolts s, the initial tension of the rubber members c can be increased, and conversely reduced, thereby varying the supplied effort accordingly. A corresponding variation of the frequency can be obtained by modifying the initial tension of the rubber members b of the oscillatory system, in the same manner.

Figure 6:
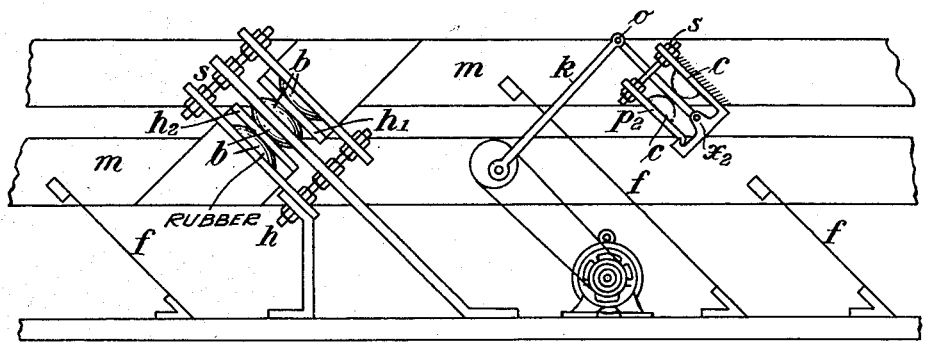
Fig. 6 is a typical embodiment of a loose coupling for small amplitudes.

Fig. 6 represents an embodiment in which a screen is energised with high frequency, that is, with oscillations up to 4000 and relatively small amplitude. In this case the transmission ratio of the oscillatory system can, of course, be 1:1, or may be reduced below parity in accordance with Fig. 7. The two masses m have also the ratio 1:1. On the other hand, the coupling is adjusted to the ratio 1:L by connecting the coupling rod k to the pivotal point o of the coupling lever $h_1$, having the ratio 1:L and periodically compressing in the one or the other direction, the two rubber members c, which can be placed under initial stress by the plate p.

By this compression, on the one hand, and the reaction of the eccentric i on the other, the oscillatory systems consisting of the masses $m_1$ and $m_2$ and the elastic means b, are actuated with a relative phase displacement of 180°. In this case also, the elastic means b can be given a corresponding initial stress by means of the tension screws s, thereby modifying the frequency. Between the rubber members b engage angle brackets $h_1$ $h_2$ of the screens $m_1$ $m_2$, which, as already mentioned, are moved with a transmission ratio of 1:1. The two oscillating masses of the screen are guided by means of the guide springs f.

Figures 7, 8, 9:
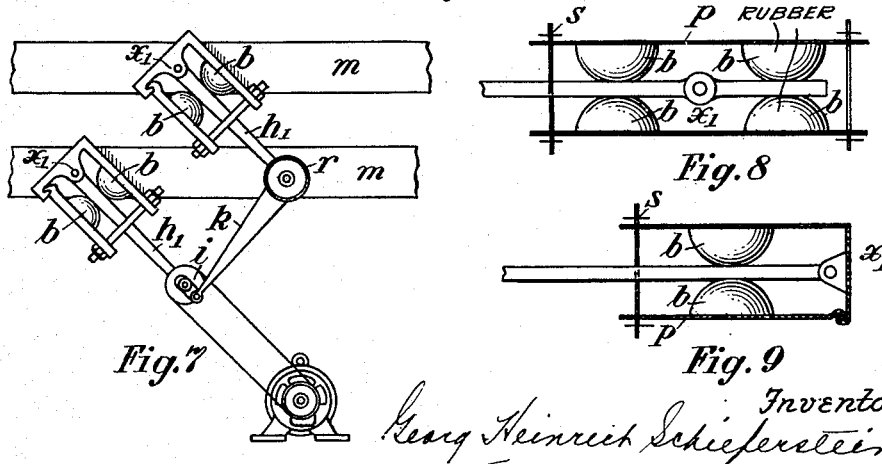
Fig. 7 is an inversion of the transmission shown in Fig. 5.
Fig. 8 shows an arrangement of the elastic means in which the pivotal point of the lever is floating.
Fig. 9 shows an arrangement in which the pivotal point is fixed.

An inversion of the transmission according to Fig. 5 is shown in Fig. 7. In this case also, the oscillatory system is composed of the elastic means b and the oscillating masses m, as previously described and illustrated. The elastic means may be subjected to initial stress, as already mentioned, and the levers turning on the pivots $x_1$ are energised by the action and reaction forces of the crank drive i, k, with interposition of a rubber ring r, whilst the levers $h_1$ are actuated, with a relative phase displacement of 180°, by the coupling k. The rubber members may be arranged, either in twos, according to Fig. 9, or in fours according to Fig. 8.

In the embodiment shown in Fig. 8, a heavily loaded pivotal point $x_1$ results, whereas in the embodiment shown in Fig. 9, the serial arrangement of rubber members in pairs, results in an unloaded pivotal point $x_1$. The frictional action of the loaded pivotal point $x_1$ in Fig. 8 can be counteracted by elastically mounting the same in known manner. In so doing, however, an upper limit, beyond which the rubber bearings of $x_1$ would be over-stressed, must not be exceeded.

In the embodiment shown in Fig. 9, the pivotal point $x_1$ may also be elastically mounted, if the type of the arrangement lead to the fear of any displacement in the direction of the lever $h_1$. In the absence of such risk, bearings of any kind for the point $x_1$ may be dispensed with in some circumstances. If, for constructional reasons, a bearing is provided, it merely has to overcome small differential forces, so that there is no need to fear that it will be over loaded.

In order to increase the elastic effect, both in couplings and in oscillatory systems, it is obvious that individual devices according to Fig. 8 can be disposed in parallel in the direction of the axis of the pivotal point $x_1$; or, which amounts to the same thing, a convenient number of rubber members may be connected in parallel. Elastic transmission of all the other forces in the joints of the coupling and of the oscillatory system is advisable on account of the damping.

Usually, and especially when large forces are to be transmitted, rubber members operate under initial stress. Even in the absence of initial stress, variation is obtainable—and also when air gaps occur between the oscillating masses and the elastic means, while in neutral position—since, in this event also, the inharmonic effect is maintained, and the frequency may be modified by altering the air gap.

It is immaterial for the purposes of the invention if other types of coupling devices or arrangements for oscillatory systems be suitably employed in conjunction with the means described in the present invention to form a loose-coupled, mechanical arrangement oscillating with variable amplitude, in which the forces and strokes are transmissible within wide limits and the oscillation proceeds in a pseudo-harmonic manner, or in which an adjustment in accordance with the present invention is possible—with regard both to the transmission of energy, and to frequency—for the purpose of obtaining an optimal effect.

Moreover, it makes no difference to the invention whether systems of the type under consideration are applied to screening apparatus, road ramming and consolidating appliances, jig conveyors, long-stroke frame saws, mowing machines, percussion tools, or any other power- or working machines. The essential advantage of the hereindescribed loose-coupled oscillatory system consists in that the pseudo-harmonic movements—which, in the machinery industry, have proved highly superior, but can only be imperfectly comprehended by the aid of mathematics—can be brought into an optimal form by adjustment.

If the above described and illustrated means be employed, and the rubber members have been correctly designed in accordance with the conditions (amplitude, maximum force and frequency), the approximate result will be:

$$n = \sqrt{\frac{P_o \cdot 900}{G \cdot f}} \quad \text{or} \quad n = \sqrt{\frac{c}{g} 900}$$

Should the difference be greater, the design of the rubber members must be modified in accordance with the points of view to be gathered from the foregoing equation, in which: $n$ denotes the frequency, $P_o$ the maximum force, $G$ the weight of the oscillating mass, $f$ the amplitude (throw of the oscillating mass from the midway position) and $c$ the constant of elasticity. The certainty that the adjustment applied has actually led to the optimal result is thus capable of mathematical proof.

The energy supplied to the resulting system through the loose coupling, within the range of resonance, is $A_k = A_s . 2\theta$, in which $A_k$ is the coupling energy, $A_s$ the oscillating energy, (wattless energy) and $\theta$ the decrement of the damping of an oscillatory system. The coupling members should be dimensioned in accordance with the amount of energy to be transmitted per second. It is, of course, preferable, wherever possible, that the elastic rubber members should be secured, on both sides, by vulcanising, for example, where the rubber members are used for producing circular oscillations, composed, in known manner, of two oscillations at a relative right angle and with a phase displacement of 90°, and consequently when a mechanical analogy with the rotary electrical field exists and a gradual straying may occur, according to the initial stress. In such cases, particularly firm vulcanised attachment is advisable, or the employment of elastic rubber members according to Figs. 10 or 11.

In Fig. 10, the lower plate $q$, for example, is firmly vulcanised, all over, to the rubber member, and the upper plate $t$ treated in the same manner within the zone bounded by A and B, whilst, in Fig. 11, the contact surfaces on both sides of the rubber member are vulcanised all over and thereby secured on the plates.

Figs. 12 to 16 show the application of the rubber members according to the invention to a special type of screening or conveying apparatus, in which the horizontally or substantially horizontally arranged device, flexibly supported on both sides of the gravitational plane, is energised only in the plane of symmetry, or gravitation, by the aid of the rubber members according to the invention, by which means such appliances can be substantially simplified and cheapened.

In Figs. 12 to 16 the screen box or conveyor trough is indicated by M. The broken line $g$ in Figs. 12 and 13 indicates the screen housed in the box or frame. $f$ denotes the guide springs, each of which is attached, at one end, to one side or the other of the box, and, at the other end, to the foundation.

If, now, the energising force is to be transmitted through the gravitational plane of the box, it is sufficient to provide a drive which acts, according to Figs. 12 and 13, on the rear end of the screening device, and in the plane of symmetry, or gravitation of the latter. According to Fig. 12, said drive consists of the crank $i$ and a connecting rod $k$ terminating in a plate $e$. Said plate $e$, which is held in position by (for example) thin spring strips $n$, acts on the two pre-stressed hemispherical rubber members $b$ in such a manner as to compress them, periodically, in one or the other direction. The rubber members $b$ transmit the periodical elastic efforts to the screen, which, in the case of the selected design of the rubber members, describes pseudo-harmonic oscillations. The type of drive selected in the embodiment shown in Fig. 12 may be termed a "potentially" coupled oscillatory system, in which the eccentric $i$ describes a movement with a phase displacement of 180° relative to the movement of the box. Since the forces in potentially-coupled oscillators are equal and oppositely directed, they counteract one another and the arrangement functions without vibration.

The embodiment shown in Fig. 13 differs from that of Fig. 12, only in respect of the type of drive, a "kinetic" coupling being employed in this case. It consists of the rotary unbalanced weight $u$ by means of which the mass $m$, clamped between the rubber members $b$, is set in oscillation. The oscillations are transmitted to the screen box M and are there utilised for the performance of work. The throw, or amplitude, $s$ described by the mass $m$ behaves, in relation to the throw $S$ of the mass M, in the same manner as the two masses to each other, that is to say: $s:S=m:M$. The mass $m$ is also provided with a sliding weight $d$, by means of which the inertia of the mass $m$ and consequently the amplitude, can be modified within certain limits. In this arrangement, the coarse adjustment of the amplitudes is effected by adjusting the initial-stressing screws $s$. Tightening said screws increases the initial stress of the rubber members $b$ and reduces the amplitude. Loosening the screws, and thereby lowering the initial tension, increases the amplitudes.

With the arrangement according to Fig. 13, the course of the movement is as follows: The unbalanced weight $u$, which is rotated by a motor or the like, acting through a flexible coupling or flexible shaft, and the mass $m$ is energised with a phase displacement of 180°, so that said mass and the screen M described in harmonic oscillations, with a relative phase displacement of 180°. Of course, the unbalanced weight, which emits radial energising efforts all round, may be replaced by a reciprocating mass or by any other known types of loose, kinetic coupling, and complete balancing of the disturbances of force and inertia effects, occurring in the coupling, can also be obtained thereby. However, in the embodiment shown in Fig. 13, the forces generated in the unbalanced weight are mostly so small as to be practically negligible and not to cause any fear of disturbance.

If, for containing the material to be transported, the screen box M be replaced by a trough, the same arrangement can be employed as a jig conveyor. The rails needed for extending such a conveyor can be assembled in known manner (Fig. 14). Both the potential and the kinetic type of coupling can also be employed in this case. It should, however, be noted that, in comparatively long jig conveyors, the vertical component may cause the trough to sag, leading, in turn, to transverse oscillations inside the trough and thus to oscillation nodes disturbing the conveying operation. For preventing the occurrence of such nodes, it has been found advantageous to energise the trough in the direction of its longitudinal axis, as is shown, as a kinetic coupling, in the embodiment according to Fig. 15, by which means a long trough is energised by longitudinal oscillations, the task of uniformly raising the trough being left entirely to the guide springs $f$, especially in cases where high frequency and low amplitudes of oscillation are employed.

If, on the other hand, the conveying capacity is to be increased, with larger amplitudes, it is advisable to replace the guide springs $f$ by link supports $y$, reinforced at both ends and bedded in rubber. When stationary troughs are in question, the lower portion of the guide springs $f$, or rocking supports $y$, may, of course, be mounted on a frame or foundation. On the other hand, in the case of troughs which are employed at the working face of quarries or the like and moved on after the same has been worked out, the rocking supports and guides cannot be mounted in the above manner. In such cases, it is of advantage to connect the basal points of the guide springs and rocking supports with the basal point $w$ of the driving mechanism by means of a chain $z$ (represented by broken lines in Figs. 14–16), or the like, since the horizontal components of the first named members have a phase displacement of 180° in relation to the basal point $w$.

I claim:

1. An energy transmitting loose-coupling means for use with a mechanical system for the transmission of power in oscillating form, including driving mechanism, and an elastically constrained driven mechanism adapted to oscillate with a variable amplitude; said energy transmitting loose-coupling means being interposed between said driving and said driven mechanisms for transmitting driving impulses from the former to the latter, said coupling comprising solid substantially segmento-spherical rubber members of constant cross section on the surface of contact with one of said mechanisms, said rubber members having their surfaces of contact fixed throughout to the last mentioned mechanism, and variable cross section on the surface of contact with the other mechanism.

2. An energy transmitting loose-coupling means for use with a mechanical system for the transmission of power in oscillating form, including driving mechanism, and an elastically constrained driven mechanism adapted to oscillate with a variable amplitude; said energy transmitting loose-coupling means being interposed between said driving and said driven mechanisms for transmitting driving impulses from the former to the latter, said coupling comprising prestressed solid substantially segmento-spherical rubber members of constant cross section on the surface of contact with one of said mechanisms, said rubber members having their surfaces of contact fixed throughout to the last mentioned mechanism, and variable cross section on the surface of contact with the other mechanism.

3. An energy transmitting loose-coupling means for use with a mechanical system for the transmission of power in oscillating form, including driving mechanism, and an elastically constrained driven mechanism adapted to oscillate with a variable amplitude; said energy transmitting loose-coupling means being interposed between said driving and said driven mechanisms for transmitting driving impulses from the former to the latter, said coupling comprising prestressed solid substantially segmento-spherical rubber members of constant cross section on the surface of contact with one of said mechanisms, said rubber members having their surfaces of contact fixed throughout to the last mentioned mechanism, and variable cross section on the surface of contact with the other mechanism, and means for adjusting the initial stresses on said rubber members.

4. An energy transmitting loose-coupling means for use with a mechanical system for the transmission of power in oscillating form, including driving mechanism, and an elastically constrained driven mechanism adapted to oscillate with a variable amplitude; said energy transmitting loose-coupling means being interposed between said driving and said driven mechanisms for transmitting driving impulses from the former to the latter, said coupling comprising a plurality of solid substantially segmento-spherical rubber members of circular and constant cross section on the surface of contact with one of said mechanisms, and variable cross section on the surface of contact with the other mechanism, the axial height of each of said rubber members being less than the diameter of the surface of constant cross section.

5. An energy transmitting loose-coupling means for use with a mechanical system for the transmission of power in oscillating form, including driving mechanism, and an elastically constrained driven mechanism adapted to oscillate with a variable amplitude; said energy transmitting loose-coupling means being interposed between said driving and said driven mechanisms for transmitting driving impulses from the former to the latter, said coupling comprising a plurality of curved solid rubber members of constant cross section on the surface of contact with one of said mechanisms, and variable cross section on the surface of contact with the other mechanism, the axial height of each of said rubber members being less than the radius of curvature of the surface of variable cross section.

6. A loose-coupling member for the transmission of the oscillations of a driving mechanism to a driven mechanism and comprising a solid rubber member of plano-convex lenticular form, the greatest thickness of the member being less than the diameter thereof.

7. A loose-coupling membber for the transmission of the oscillations of a driving mechanism to a driven mechanism and comprising a solid rubber member of plano-convex lenticular form, the greatest thickness of the member being less than the radius of curvature of the convex side of the member.

8. A loose-coupling member for the transmission of the oscillations of a driving mechanism to a driven mechanism and comprising a solid rubber member of segmento-spherical form, the greatest thickness of the member being less than the diameter thereof.

9. A loose-coupling member for the transmission of the oscillations of a driving mechanism to a driven mechanism and comprising a solid rubber member of segmento-spherical form, the greatest thickness of the member being less than the radius of curvature of the convex side of the member.

GEORG HEINRICH SCHIEFERSTEIN.